(12) United States Patent
Kikin (10) Patent No.: US 9,355,349 B2
(45) Date of Patent: May 31, 2016

(54) LONG RANGE RFID TAG

(71) Applicant: Applied Wireless Identifications Group, Inc., Morgan Hill, CA (US)

(72) Inventor: Vadim Kikin, Spring Valley, NY (US)

(73) Assignee: Applied Wireless Identifications Group, Inc., Morgan Hill, CA (US)

( * ) Notice: Subject to any disclaimer, the term of this patent is extended or adjusted under 35 U.S.C. 154(b) by 0 days.

(21) Appl. No.: 14/198,427

(22) Filed: Mar. 5, 2014

(65) Prior Publication Data

US 2014/0252095 A1      Sep. 11, 2014

Related U.S. Application Data

(60) Provisional application No. 61/774,445, filed on Mar. 7, 2013.

(51) Int. Cl.

| | |
|---|---|
| *G06K 19/06* | (2006.01) |
| *G06K 19/077* | (2006.01) |
| *H01Q 1/22* | (2006.01) |
| *H01Q 1/36* | (2006.01) |
| *H01Q 7/00* | (2006.01) |
| *H01Q 9/04* | (2006.01) |
| *H01Q 21/28* | (2006.01) |

(52) U.S. Cl.
CPC ........ *G06K 19/07773* (2013.01); *H01Q 1/2225* (2013.01); *H01Q 1/36* (2013.01); *H01Q 7/00* (2013.01); *H01Q 9/0407* (2013.01); *H01Q 21/28* (2013.01)

(58) Field of Classification Search
CPC ............... G06K 19/07749; G06K 19/07756; G06K 19/07773
USPC ............................ 235/492, 462.46, 472.02
See application file for complete search history.

(56) References Cited

U.S. PATENT DOCUMENTS

| | | | |
|---|---|---|---|
| 2,990,547 | A | 6/1961 | Mcdougal |
| 4,123,754 | A | 10/1978 | Armstrong |
| 4,589,422 | A | 5/1986 | James et al. |
| 4,700,194 | A | 10/1987 | Ogawa et al. |
| 4,736,207 | A | 4/1988 | Siikarla et al. |
| 4,782,345 | A | 11/1988 | Landt |
| 4,821,040 | A | 4/1989 | Johnson et al. |
| 4,835,541 | A | 5/1989 | Johnson et al. |
| 5,276,431 | A | 1/1994 | Piccoli et al. |
| 5,376,943 | A | 12/1994 | Blunden et al. |
| 5,392,049 | A | 2/1995 | Gunnarsson |
| 5,414,427 | A | 5/1995 | Gunnarsson |
| 5,552,790 | A | 9/1996 | Gunnarsson |
| 5,557,279 | A | 9/1996 | D'Hont |
| 5,682,143 | A | 10/1997 | Brady et al. |
| 5,945,938 | A | 8/1999 | Chia et al. |
| 5,973,600 | A | 10/1999 | Mosher, Jr. |
| 5,995,048 | A | 11/1999 | Smithgall et al. |
| 6,049,278 | A | 4/2000 | Guthrie et al. |
| 6,072,383 | A | 6/2000 | Gallagher, III et al. |

(Continued)

OTHER PUBLICATIONS

Stewart, R.G., U.S. Appl. No. 11/367,061, filed Mar. 3, 2006.

*Primary Examiner* — Daniel St Cyr
(74) *Attorney, Agent, or Firm* — Zilka-Kotab, PC (57) ABSTRACT

A Radio Frequency Identification (RFID) tag according to one embodiment includes a radiating element lying primarily along a plane, a conductive loop lying along a plane oriented about perpendicular to the plane of the radiating element, and an integrated circuit coupled to the conductive loop.

17 Claims, 9 Drawing Sheets

(56) References Cited

U.S. PATENT DOCUMENTS

| | | |
|---|---|---|
| 6,118,379 A | 9/2000 | Kodukula et al. |
| 7,233,241 B2 * | 6/2007 | Overhultz et al. ......... 340/539.2 |
| 7,403,158 B2 | 7/2008 | Kikin |
| 7,750,862 B2 * | 7/2010 | Hilgers ..................... 343/726 |
| 7,768,400 B2 | 8/2010 | Lawrence et al. |
| 7,880,619 B2 | 2/2011 | Brown et al. |
| 2007/0206705 A1 | 9/2007 | Stewart |
| 2010/0045025 A1 | 2/2010 | Cote et al. |
| 2012/0181341 A1 | 7/2012 | Cote et al. |

* cited by examiner

LONG RANGE RFID TAG

RELATED APPLICATIONS

This application claims priority from U.S. Provisional Patent Application No. 61/774,445 filed on Mar. 7, 2013, which is herein incorporated by reference.

FIELD OF THE INVENTION

The present invention relates to Radio Frequency (RF) communication devices, and more particularly, this invention relates to a Radio Frequency Identification (RFID) tag having increased operating range limits.

BACKGROUND

Some RFID systems use reflected or "backscattered" radio frequency (RF) waves to transmit information from an RFID tag to an RFID reader. Passive tags harvest all of their operating power from the signal received from the reader; therefore passive tags are only powered when in the signal beam of the reader. When powered, the passive tags may receive and process the information received from the reader signal, whereupon the tag may communicate back to the reader using backscattering. However, as the distance between the tag and the reader increases, the power and signal strength decreases.

Thus passive RFID tags are limited to a certain distance from the RFID reader (e.g., a range) in which the power and signal strength are high enough to operate the passive tag. In conventional products, the ratio of the operating range with respect to the size of a tag has been significantly limited. For examples of such conventional disadvantages, see any of the following U.S. Pat. No. 4,123,754 entitled "Electronic detection and identification system". U.S. Pat. No. 4,736,207 entitled "Tag device and method for electronic article surveillance", U.S. Pat. No. 4,782,345 entitled "Transponder antenna", U.S. Pat. No. 5,376,943 entitled "Moving vehicle transponder", and U.S. Pat. No. 5,682,143 entitled "Radio frequency identification tag."

The operating range of an RFID tag may be increased as the size of the tag itself is increased, however, this is unfavorable as it increases costs, as well as space required to house the enlarged tag itself. Further description of such unfavorable results can be found in U.S. Pat. No. 6,049,278 entitled "Monitor tag with patch antenna."

Furthermore, semi-passive tags use a supplemental power source, e.g., battery, for tag operations when the tag is unable to harvest enough energy from the RF signal. While reader-to-tag communication distances are greatly increased relative to passive tags, the range of semi-passive tags is likewise limited. For further examples of such conventional disadvantages, see either of the following U.S. Pat. No. 5,392,049 entitled "Device for positioning a first object relative to a second object", and U.S. Pat. No. 5,414,427 entitled "Device for information transmission."

BRIEF SUMMARY

A Radio Frequency Identification (RFID) tag according to one embodiment includes a radiating element lying primarily along a plane, a conductive loop lying along a plane oriented about perpendicular to the plane of the radiating element, and an integrated circuit coupled to the conductive loop.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Furthermore, as used herein, the term "about" with reference to some stated value refers to the stated value±10% of said value.

Illustrative examples of RFID systems, including RFID tags and readers, are described in U.S. patent application Ser. No. 11/367,061 filed Mar. 3, 2006 which is incorporated by reference. Such RFID systems may be used with various embodiments described and/or suggested herein.

In one general embodiment, an RFID tag includes a radiating element lying primarily along a plane, a conductive loop lying along a plane oriented about perpendicular to the plane of the radiating element, and an integrated circuit coupled to the conductive loop.

As described above, passive RFID tags are limited to a certain operating distance from an RFID reader (e.g., a range) in which the power and signal strength are high enough to enable operation of the passive tag. Likewise, the effective range of semi-passive tags is also limited. In conventional products, the ratio of the operating range with respect to the size of a tag has been significantly limited. The operating range of an RFID tag may be increased as the size of the tag itself is increased, however, this is unfavorable as it increases costs, as well as space required to house the enlarged tag itself.

To overcome the forgoing disadvantages, various embodiments described and/or suggested herein preferably include designs that increase the operating range limits for an RFID tag.

Figure 1:
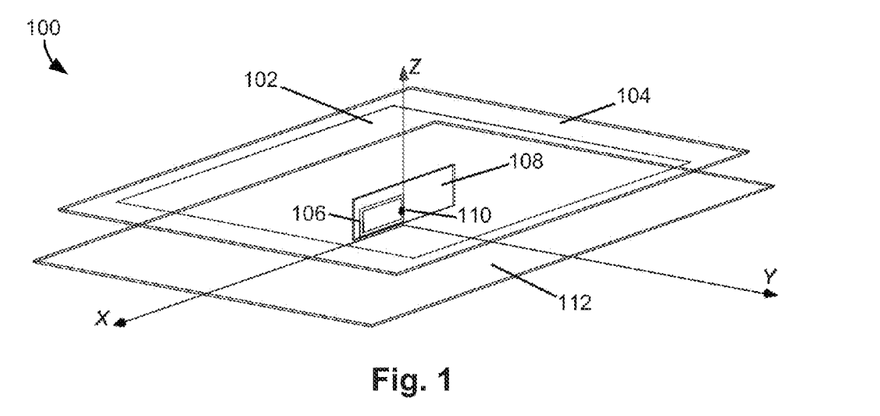
FIG. 1 is a partial perspective view of an RFID tag according to one embodiment.

FIG. 1 depicts a partial perspective view of an RFID tag 100 having an RFID IC incorporated with a patch antenna, in accordance with one embodiment. As an option, the present RFID tag 100 may be implemented in conjunction with features from any other embodiment listed herein, such as those described with reference to the other Figs. Of course, however, such RFID tag 100 and others presented herein may be used in various applications and/or in permutations which may or may not be specifically described in the illustrative embodiments listed herein. Further, the RFID tag 100 presented herein may be used in any desired environment.

As illustrated in FIG. 1 the RFID tag 100 includes a loop substrate 108 having a conductive loop 106 thereon and an RFID IC 110 electrically coupled to the conductive loop 106. The conductive loop and RFID IC are positioned about perpendicular (e.g., between 80 and 100 degrees) to the X-Y plane of the coordinate system of FIG. 1. By positioning the conductive loop and RFID IC about perpendicular to the X-Y plane, the conductive loop has a maximum amount of area exposed to the magnetic field oriented substantially perpendicular thereto (e.g., along the X-Y plane). Thus, the maximum amount of energy may be transformed from the magnetic field. Furthermore, coupling between the magnetic field of the radiating element 102 (lying primarily along the X-Y plane) and the conductive loop are improved, as will be discussed in further detail below.

In different approaches, the conductive loop may include any conductive material, such as copper, gold, aluminum, silver, etc. Moreover, the size (e.g., dimensions) of the conductive loop may be designed to correspond to a preferred functionality and/or performance of the RFID tag, depending on the desired embodiment, as will be discussed in further detail below.

Figure 7A:
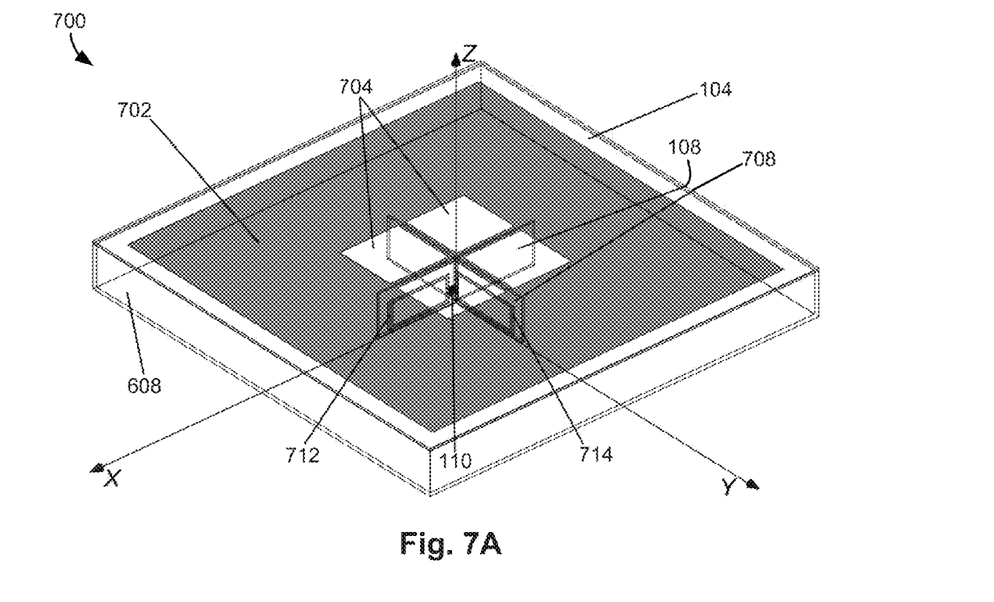
FIG. 7A is a partial perspective view of an RFID tag according to one embodiment.
Figure 7B:
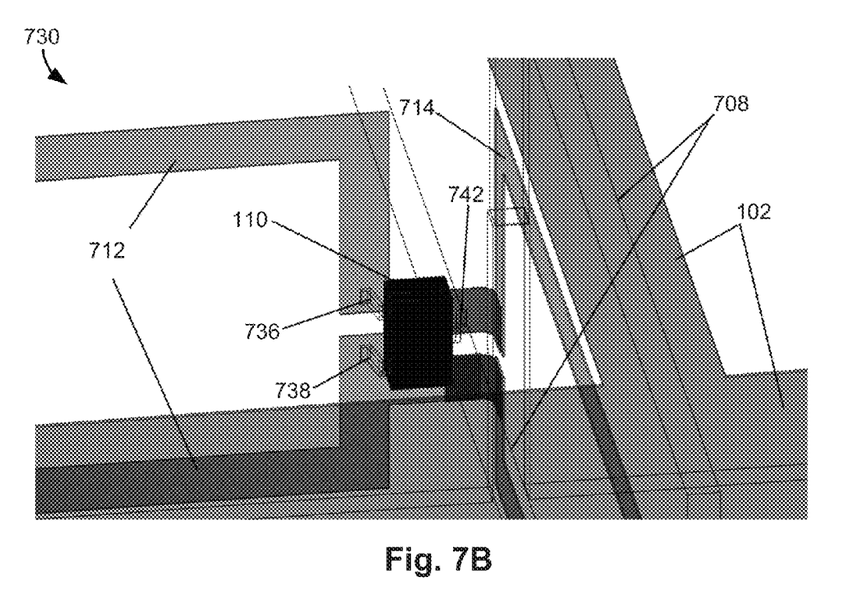
FIG. 7B is a detailed view of a connection between an RFID integrated circuit (IC), and two conductive loops, according to one embodiment.

The RFID IC may be of any type known in the art, depending on the desired embodiment (e.g., see FIG. 7B). Moreover, according to various approaches, the loop substrate may include a dielectric substrate, nonconductive substrate, etc., including, but not limited to a printed circuit board (PCB), copper laminated FR4, G10, Rogers etc., and/or other dielectric substrate materials developed for the electronics industry.

With continued reference to FIG. 1, the RFID tag patch antenna has a rectangular radiating element 102 on a radiating element substrate 104. According to different approaches, the rectangular radiating element may be square, "H" shaped (see FIG. 5), etc. According to various approaches, the radiating element may include any conventional RF antenna material known in the art. The radiating element substrate may include the same, similar or different materials to that of the loop substrate. Ideally, the radiating element substrate is substantially RF transparent, e.g., >95% RF transparent, ideally >99% RF transparent.

The patch antenna of FIG. 1 also includes a conductive layer 112, which may include the same, similar or different materials to that of the conductive loop, depending on the desired embodiment. The conductive layer is spaced from the radiating element by an amount that may be readily determined by modeling using the teachings herein. Illustrative dimensions for the spacing between the conductive layer and the radiating element may be from about 0.05 inch to about 2 inches depending on the desired embodiment.

Moreover, a supporting structure (not shown) of any type known in the art may be used to support the radiating element substrate relative to the conductive layer. Preferably, the supporting structure is substantially RF transparent and/or is substantially RF invisible to the operation of the patch antenna. According to the present description, "invisible" is intended to mean that the supporting structure has a negligible effect, if any, on RF signals that may pass therethrough and/or nearby.

In one approach, the supporting structure may include members such as pillars, walls, etc. extending between the radiating element substrate and the conductive layer and/or substrate thereof. According to another exemplary embodiment, the space between the conductive layer and the radiating element, according to any of the approaches described and/or suggested herein, may be filled with a substantially RF transparent material such as Styrofoam or other foam-like materials. The substantially RF transparent material may provide added mechanical support to the device, thereby strengthening the device. Moreover, the RF transparent material may preferably displace the air within the structure, thereby protecting the device from moisture, contaminants, etc. in the air, depending on the environment. Furthermore, the material of the substantially RF transparent material may preferably be nonconductive, e.g., to prevent from shorting out the device.

Figure 2:
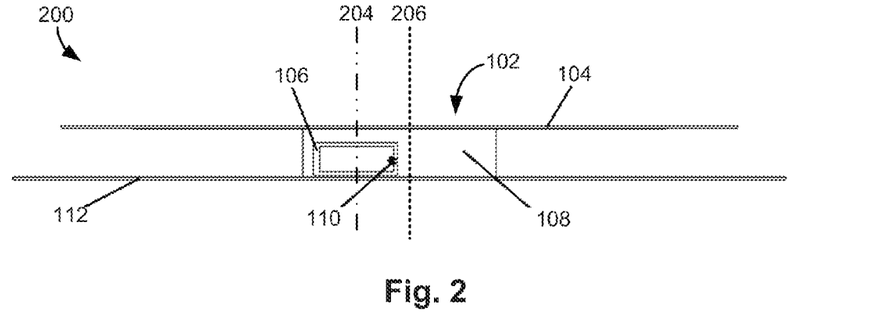
FIG. 2 is a side view of an RFID tag according to one embodiment.
Figure 3:
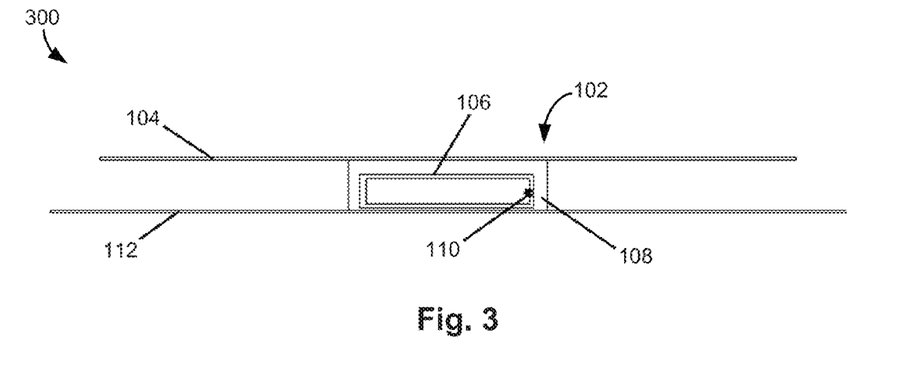
FIG. 3 is a side view of an RFID tag according to different embodiments.

FIGS. 2-3 depict side views of RFID tags 200, 300, respectively, that are similar to that illustrated in FIG. 1, according to two different embodiments. As an option, the present tags 200, 300 may be implemented in conjunction with features from any other embodiment listed herein, such as those described with reference to the other Figs. Of course, however, such tags 200, 300 and others presented herein may be used in various applications and/or in permutations which may or may not be specifically described in the illustrative embodiments listed herein. Further, the tags 200, 300 presented herein may be used in any desired environment.

As illustrated, FIG. 2 shows the conductive loop and RFID IC positioned off center of the radiating element. In other words, a centerline 204 of the conductive loop and a centerline 206 of the radiating element are offset from one another as illustrated.

Looking to FIG. 3, according to another illustrative embodiment, the conductive loop and RFID IC may be positioned at about center of the radiating element. As also shown in FIG. 3, the conductive loop is lengthened relative to the conductive loop of FIG. 2. Thus, the circumference of the conductive loop in FIG. 3 is greater than the circumference of the conductive loop in FIG. 4.

The positioning of the conductive loop and RFID IC within the patch antenna, in addition to the dimensions of the conductive loop itself, may be designed to about match the impedance of the RFID IC and conductive loop. Thus, an accurate matching of the impedance may maximize the energy transformed from the magnetic field to current, e.g., available to the RFID IC, as described in more detail below with reference to FIG. 4.

As alluded to above, the dimensions (e.g., size), positioning, and/or shape of the conductive loop may be designed to correspond to a preferred functionality and/or performance of the RFID tag. In a preferred approach, the length of the conductive loop may be from about 1/1000 of an operational wavelength (including some or all values in an operational range) at which the tag is configured to operate, to about 1/5 of the wavelength, depending on the embodiment. Moreover, in various approaches, the RFID tag may be operable with RF signals where the frequency of the incoming signal may be from about 100 MHz to about 6 GHz.

By designing the dimensions, positioning and/or shape of the conductive loop, the amount of the magnetic field's energy transformed to current inside the conductive loop and/or RFID IC may be increased. This provides an increased amount of energy to the RFID IC and has been found by the inventor to increase the effective operating range of the embodiments described and/or suggested herein to about 100 feet, as will be discussed in further detail below.

According to different approaches, the dimensions (e.g., size), positioning, and/or shape of the conductive loop may be determined using analysis, modeling, simulation, measurement, experimentation, etc. using the teachings presented herein. The determined dimensions (e.g., size), positioning, and/or shapes may be stored in computer program code, logic, lookup tables, etc., e.g., for later use.

According to the embodiments disclosed herein, it should be noted that there is no physical path of conductive material extending between the conductive loop and the radiating element for directly electrically coupling the conductive loop to the radiating element. Particularly, see FIGS. 1-6A and 7A. Rather, incident electromagnetic waves cause a magnetic field to form in the vicinity of the radiating element, which in turn couples to the conductive loop, creating a current therein, as will soon become apparent.

Figure 4:
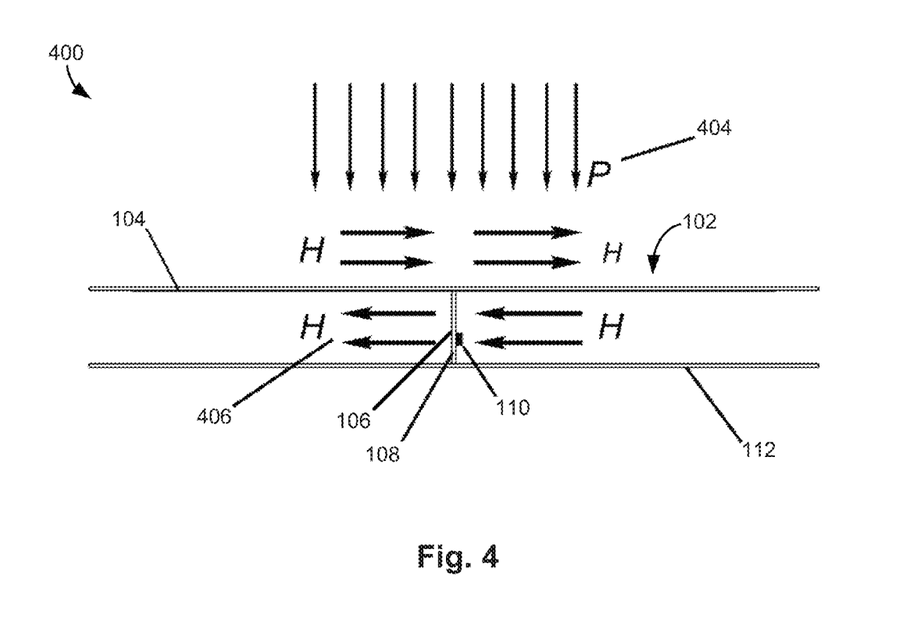
FIG. 4 is a representational view of an RFID tag according to one embodiment.

FIG. 4 depicts a representational view of an RFID tag 400 having an RFID IC inside a patch antenna, in accordance with one embodiment. As an option, the present RFID tag 400 may be implemented in conjunction with features from any other embodiment listed herein, such as those described with reference to the other Figs. Of course, however, such RFID tag 400 and others presented herein may be used in various applications and/or in permutations which may or may not be specifically described in the illustrative embodiments listed herein. Further, the RFID tag 400 presented herein may be used in any desired environment.

Referring now to FIG. 4, the patch antenna includes a rectangular radiating element, which collects and transforms an incident electromagnetic wave 404 into a strong magnetic field around the radiating element. The arrows 406 shown in FIG. 4 represent the vector of the respective magnetic field H at different locations with respect to the RFID tag. The magnetic field induced by the incident electromagnetic wave crosses the conductive loop, providing efficient energy transducing. Moreover, the magnetic field tends to be focused at the center of the radiating element.

Referring still to the FIG. 4, the conductive loop and conductive loop substrate extend into and out of the page of the Figure. Moreover, the plane of the conductive loop is about perpendicular to the direction of the magnetic field crossing therethrough (e.g., represented by the vectors 406 of the magnetic field). The RF energy from the incident electromagnetic wave is in the field hitting the radiating element, whereby the energy from the radiating element as a whole is focused towards the middle of the radiating element, thereby creating an increased magnetic field towards the middle of the radiating element. Thus, by positioning the conductive loop about perpendicular to the direction of the resulting increased magnetic field near the center of the device where the magnetic field is concentrated, the energy of the magnetic field transformed to current inside the loop is increased. This provides a more maximized amount of current to the RFID IC and increases the effective operating range of various embodiments, e.g., to about 100 feet, without increasing the size of the tag itself.

Figure 5:
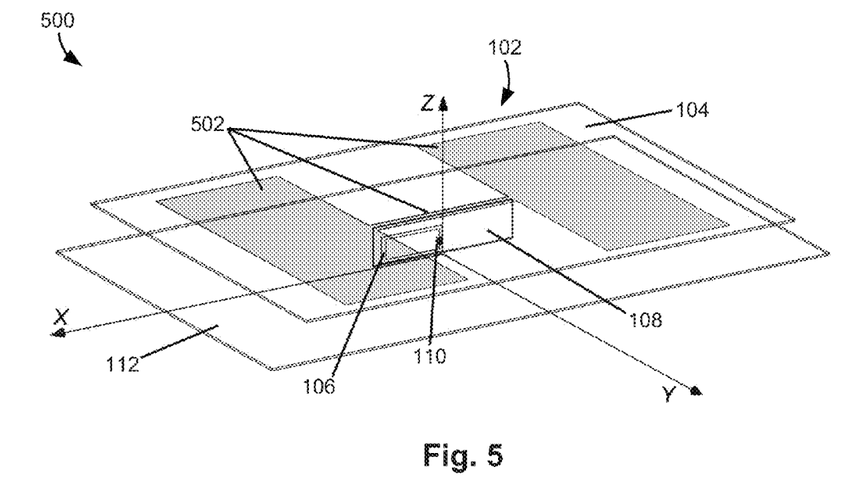
FIG. 5 is a partial perspective view of an RFID tag according to one embodiment.

FIG. 5 depicts a partial perspective view of an RFID tag 500 having an RFID IC inside a patch antenna, in accordance with one embodiment. As an option, the present RFID tag 500 may be implemented in conjunction with features from any other embodiment listed herein, such as those described with reference to the other Figs. Of course, however, such RFID tag 500 and others presented herein may be used in various applications and/or in permutations which may or may not be specifically described in the illustrative embodiments listed herein. Further, the RFID tag 500 presented herein may be used in any desired environment. Thus FIG. 5 (and the other Figs.) should be deemed to include any and all possible permutations.

FIG. 5 illustrates a conductive loop and RFID IC positioned within the patch antenna of the present embodiment. Moreover, the radiating element is constructed in an "H" configuration such that two rectangular radiating element portions 502, on either side of the loop substrate, are connected by a narrower conductive path (e.g., than the portions) therebetween. Although the present embodiment illustrates the narrower conductive path as a strip of the radiating element material, in other embodiments, the narrower conductive path may be one or more resistors having a resistance of about zero Ohms, chip inductors, wire, etc.

Referring still to FIG. 5, such "H" shape of the radiating element concentrates the magnetic field towards the narrow conductive path at the middle of the patch antenna, preferably without sacrificing the gain. Thus, the radiating element provides a more efficient transduction of energy into the RFID IC via the conductive loop, in terms of energy available to the RFID IC for harvesting and/or strength of the incoming signal to be processed by the RFID IC.

Figure 6A:
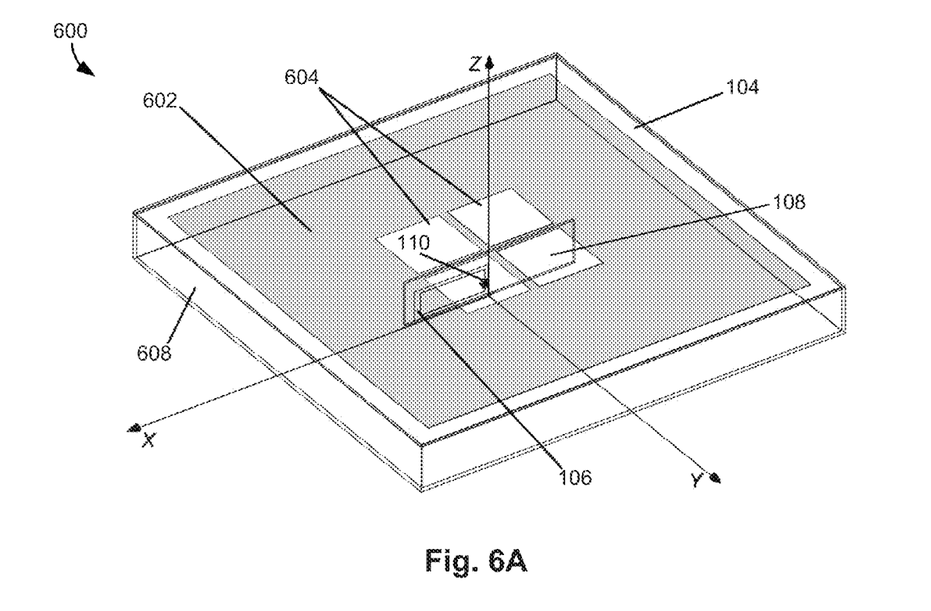
FIG. 6A is a partial perspective view of an RFID tag according to one embodiment.

FIG. 6A depicts another partial perspective view of an RFID tag 600 having an RFID IC inside a patch antenna, in accordance with one embodiment. Further examples of a patch antenna are presented in U.S. Pat. No. 7,403,158 entitled "Compact circular polarized antenna" which is herein incorporated by reference.

As an option, the present RFID tag 600 may be implemented in conjunction with features from any other embodiment listed herein, such as those described with reference to the other Figs. Of course, however, such RFID tag 600 and others presented herein may be used in various applications and/or in permutations which may or may not be specifically described in the illustrative embodiments listed herein. Further, the RFID tag 600 presented herein may be used in any desired environment. Thus FIG. 6A (and the other Figs.) should be deemed to include any and all possible permutations.

As illustrated in FIG. 6A, the conductive loop and RFID IC are positioned within the patch antenna. The outer periphery of the radiating element 602 is about square, having narrow conductive orthogonal paths formed between the radiating element cutouts 604. Moreover, the conductive loop is positioned such that it extends along one of the conductive orthogonal paths of the radiating element.

Furthermore, the radiating element 602 is positioned in a conductive open box 608 configuration of the conductive layer, with a bottom plane and sides extending upwardly therefrom, thereby having one side opened, e.g., the top side of the box along the positive Z-axis. This configuration allows a reduced size of the antenna without causing significant degradation in efficiency of transducing energy of incident plane electromagnetic waves into the RFID IC, as will soon become apparent.

Figure 6B:
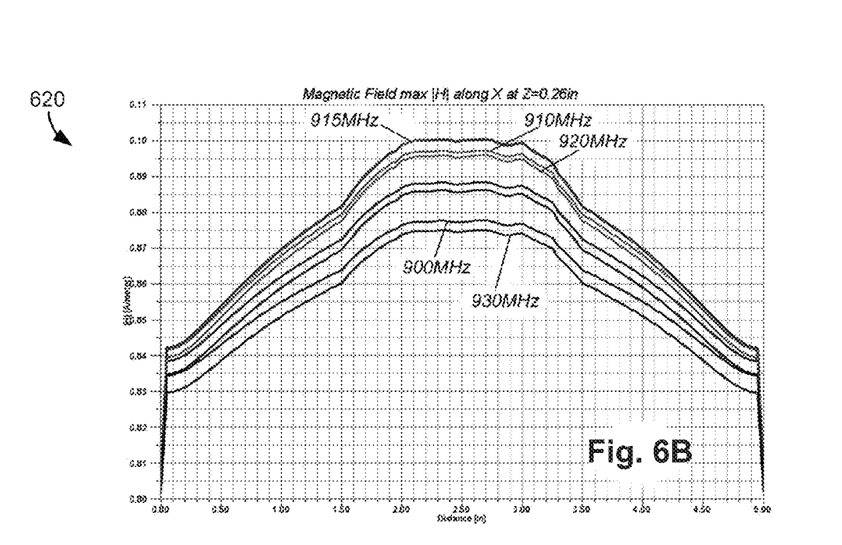
FIG. 6B is a graph depicting the magnetic field strength distribution of the RFID tag of FIG. 6A.

FIG. 6B is a graph 620 illustrating the magnetic field strength distribution along the narrow conductive orthogonal path in the middle of the RFID tag between the radiating element and the bottom of the conductive open box for an RFID tag having the same configuration as that shown in FIG. 6A. Moreover, it should be noted that the data presented in the graph 620 of FIG. 6B was achieved by the inventor using modeling and electromagnetic field simulation.

As illustrated in the graph 620, the maximum magnetic fields (|H|) for various incoming signals at the noted frequencies were measured at a distance of Z=0.26 inches along the X-axis where X=0 at a first edge of the radiating element, and where the width of the radiating element is 5 inches. As depicted, the maximum magnetic field is located towards the center of the radiating element, e.g., between X=2 and 3 inches.

Figure 6C:
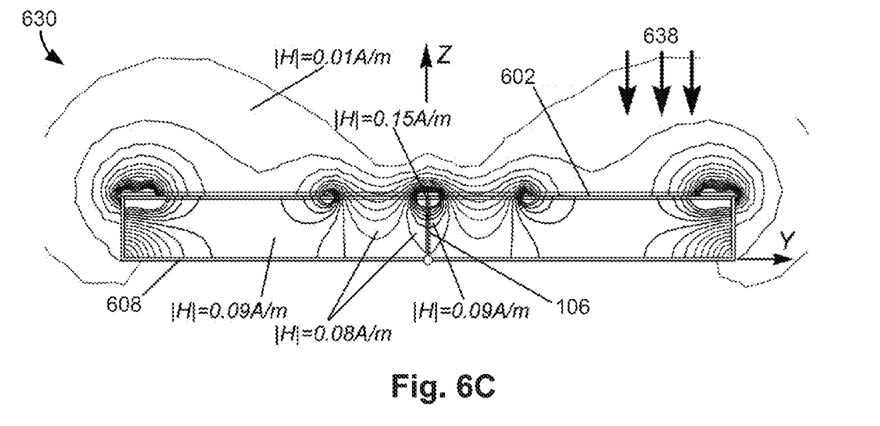
FIG. 6C is an illustration of the magnetic field strength distribution along the Z-Y plane of the RFID tag of FIG. 6A.

FIG. 6C is an illustration of a graph 630 of the magnetic field strength distribution along the Z-Y plane of a cross-sectional view of the embodiment illustrated in FIG. 6A. Moreover, as mentioned above for FIG. 6B, it should be noted that the data presented in the graph 630 of FIG. 6C was achieved by the inventor using modeling and electromagnetic field simulation.

Looking to the graph 630, the incident wave 638, having an energy |E| of 1 Volt per meter (V/m) causes the magnetic field |H| to focus at the narrow conductive orthogonal path extending in the X direction above the conductive loop (as seen in FIG. 6A), at 0.15 Ampere per meter (A/m), e.g., signifying coupling between the between the magnetic field and the conductive loop as explained above.

Figure 6D:
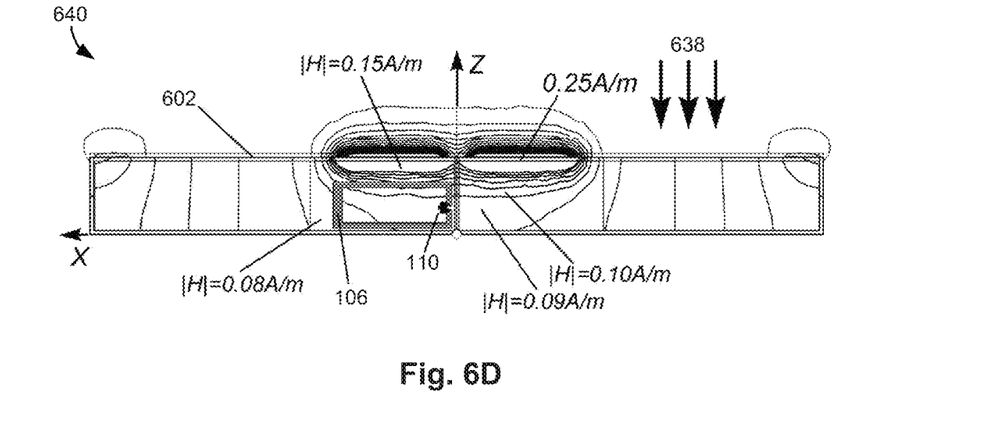
FIG. 6D is an illustration of the magnetic field strength distribution along the Z-X plane of the RFID tag of FIG. 6A.

FIG. 6D is an illustration of another graph 640 of the magnetic field strength distribution along a cross-sectional view of the Z-X plane derived from modeling and electromagnetic field simulation conducted on an embodiment substantially similar to that illustrated in FIG. 6A. Again, the graph 640 shows the magnetic field as maximized near the middle of the radiating element, signifying coupling between the between the magnetic field and the conductive loop.

FIG. 7A depicts yet another partial perspective view of an RFID tag 700 having an RFID IC inside a patch antenna, in accordance with one embodiment. As mentioned above, additional example of a patch antenna are presented in U.S. Pat. No. 7,403,158 entitled "Compact circular polarized antenna" which has been incorporated by reference.

As an option, the present RFID tag 700 may be implemented in conjunction with features from any other embodiment listed herein, such as those described with reference to the other Figs. Of course, however, such RFID tag 700 and others presented herein may be used in various applications and/or in permutations which may or may not be specifically described in the illustrative embodiments listed herein. Further, the RFID tag 700 presented herein may be used in any desired environment. Thus FIG. 7A (and the other Figs.) should be deemed to include any and all possible permutations.

FIG. 7A illustrates two conductive loops, conductive loop X 712 and conductive loop Y 714 that lie along orthogonal planes. Moreover, conductive loop X and conductive loop Y have substrates 108, 708, respectively. The RFID IC is coupled to both of the conductive loops, as shown in more detail in FIG. 7B. Moreover, the outer periphery of the radiating element 702 is about square, having narrow conductive orthogonal paths between the radiating element cutouts 704. The radiating element is positioned inside the conductive box, having one open side, e.g., as described above for FIG. 6A.

Referring still to FIG. 7A, the orthogonally-oriented conductive loops X and Y provide dual polarized functions, the first of which includes maintaining efficiency of transducing energy of incident plane electromagnetic waves with random polarization angles. Additionally, the configuration provides energy transduction of incident electromagnetic waves with circular polarization. Having conductive loops in two planes increases the amount of the energy extractable from the magnetic field (e.g., resulting from the incoming incident wave), which is then transformed to current inside the conductive loops. As a result, the orthogonally-oriented conductive loops provide an increased amount of current to the RFID IC and increase the effective operating range of the embodiment.

FIG. 7B illustrates a partial perspective view of an RFID tag 730 having a connection between an RFID IC and two conductive loops, conductive loop X and conductive loop Y, according to an exemplary embodiment.

Referring now to FIG. 7B, it should be noted that RFID IC has dual port capability. Thus, according to one approach, two inputs may be used, thereby enabling the use of dual conductive loops to collect and/or focus energy from two locations on the device (see FIG. 7A). Moreover, conductive loop X and conductive loop Y are positioned orthogonally to each other (e.g., see FIG. 7A).

RFID tag 730 further includes pins to couple conductive loop X and conductive loop Y. As illustrated, first pin 736 and second pin 738 are coupled to either end of conductive loop X, while third pin 742 is coupled to one end of conductive loop Y. By using independent pins 736, 738, 742 to couple the conductive loops, the embodiment illustrated in FIG. 7B is able to achieve an increased effective operating range.

According to various approaches, one or more of the pins 736, 738, 742 may include any pin type which would be apparent to one skilled in the art upon reading the present description. Moreover, although it may be preferred that each of the pins are of the same type and/or configuration, in other approaches, one or more of the pins may be of a type and/or configuration different than the others.

Figure 8A:
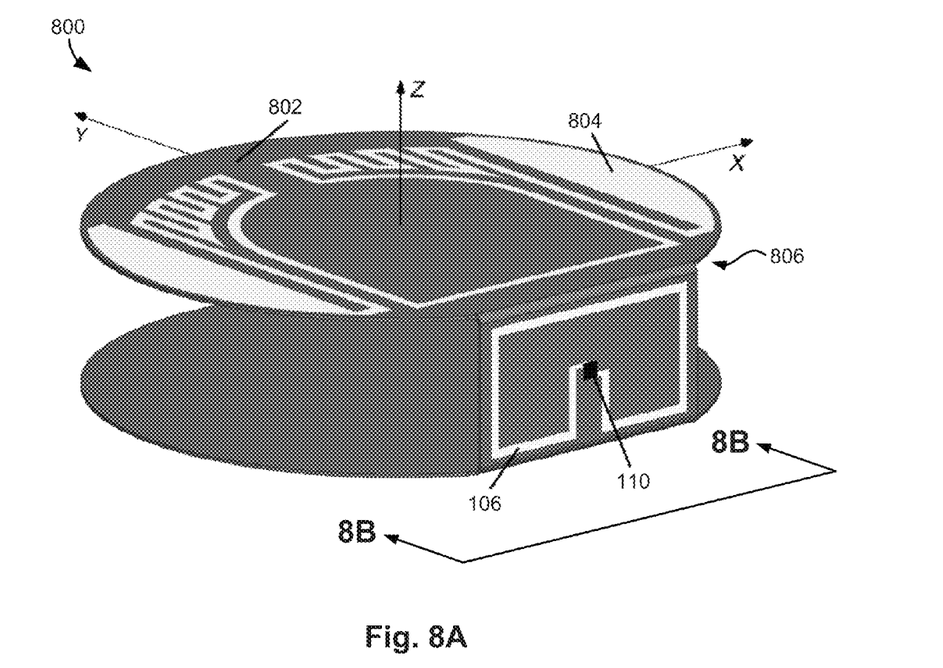
FIG. 8A is a partial perspective view of an RFID tag according to one embodiment.
Figure 8B:
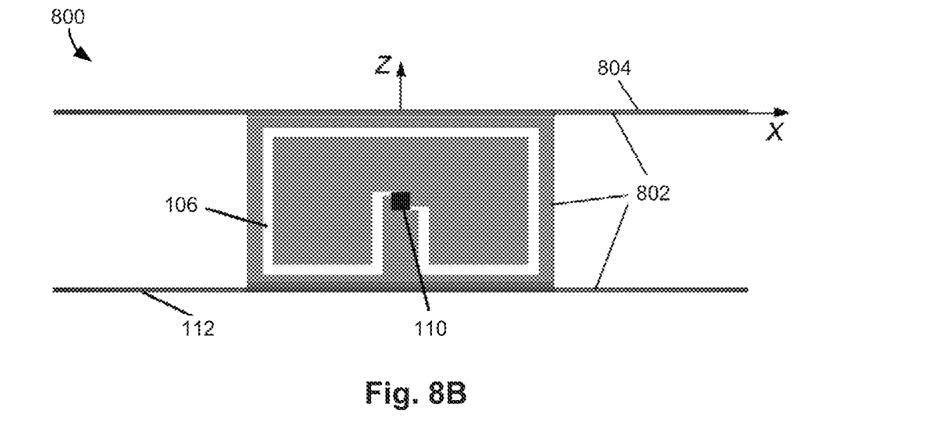
FIG. 8B is a side view of the RFID tag of FIG. 8A taken along line 8B-8B.

FIGS. 8A-8B illustrate an RFID tag 800 having a folded structure, according to yet another exemplary embodiment. As an option, the present RFID tag 800 may be implemented in conjunction with features from any other embodiment listed herein, such as those described with reference to the other Figs. Of course, however, such RFID tag 800 and others presented herein may be used in various applications and/or in permutations which may or may not be specifically described in the illustrative embodiments listed herein. Further, the RFID tag 800 presented herein may be used in any desired environment. Thus FIGS. 8A-8B (and the other Figs.) should be deemed to include any and all possible permutations.

Referring now to FIGS. 8A-8B, the RFID tag 800 included an improved substrate structure. Production targets include reducing the production cost of high performance tags. Thus, the components of the present embodiment, e.g., the conducive loop 106, RFID IC 110, radiating element 804, are positioned on the substrate 802 having flexible and preferably thin dielectric properties, e.g., at least as thin as substrate values presented above for other embodiments. In further approaches, the substrate may be wrapped around a dielectric spacer (not shown). Accordingly, in some approaches, the conductive loop and the radiating element may be positioned on a single, contiguous dielectric substrate.

As a result, the substrate may be folded, e.g., during production, to form a general three dimensional RFID tag shape as seen in FIGS. 8A-8B. Thus, it follows that the substrate and/or RFID tag as a whole may be formed on an unfolded structure (e.g., see FIG. 9C), before being folded to form the three dimensional RFID tag shape.

Referring still to FIGS. 8A-8B, the radiating element is a folded dipole with a narrower conductive path spanning between two portions of the radiating element. Descriptions of additional embodiments similar to that which is depicted in FIGS. 8A-8B are presented in U.S. Pat. No. 2,990,547A entitled "Antenna structure" which is herein incorporated by reference.

Furthermore, the narrower conductive path of FIGS. 8A-8B is positioned close to one of the edges 806 of the RFID tag's folded structure. In the approach shown, a plane extending along the conductive loop does not intersect the radiating element. As described above, the narrower conductive path of the radiating element creates a concentrated current therein, which in turn creates an increased magnetic field that effectively couple with the conductive loop connected to RFID IC.

Looking to FIG. 8B in particular, the side view of this embodiment illustrates the bottom portion of the substrate which contains a conductive layer 112. In a preferred approach, the conductive layer may be able to reduce the influence of a media that may be located beneath the RFID tag 800. However, according to various embodiments, the conductive layer may include any of the approaches described herein.

Figure 9A:
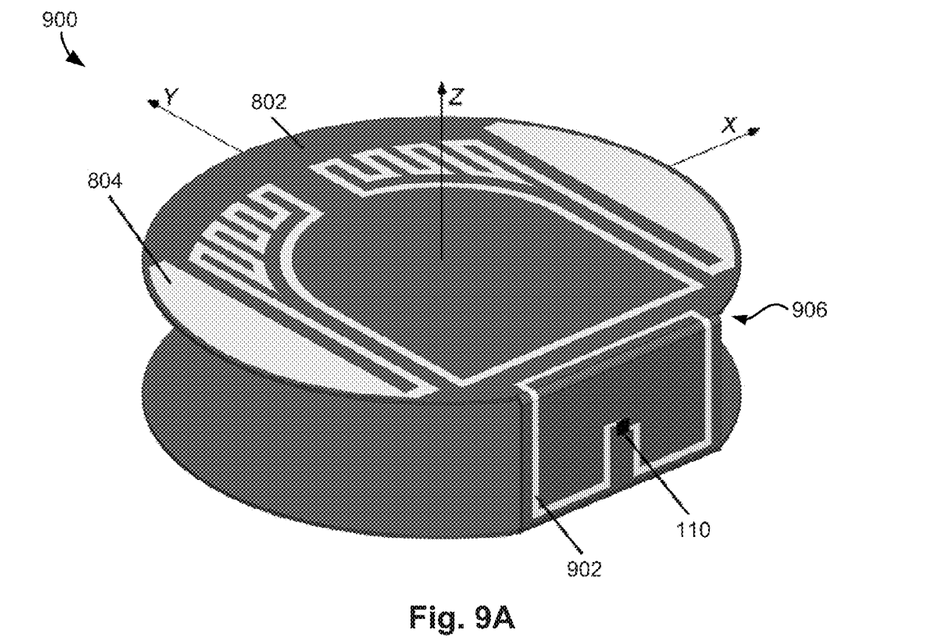
FIGS. 9A-9B are perspective views of an RFID tag according to one embodiment.
Figure 9B:
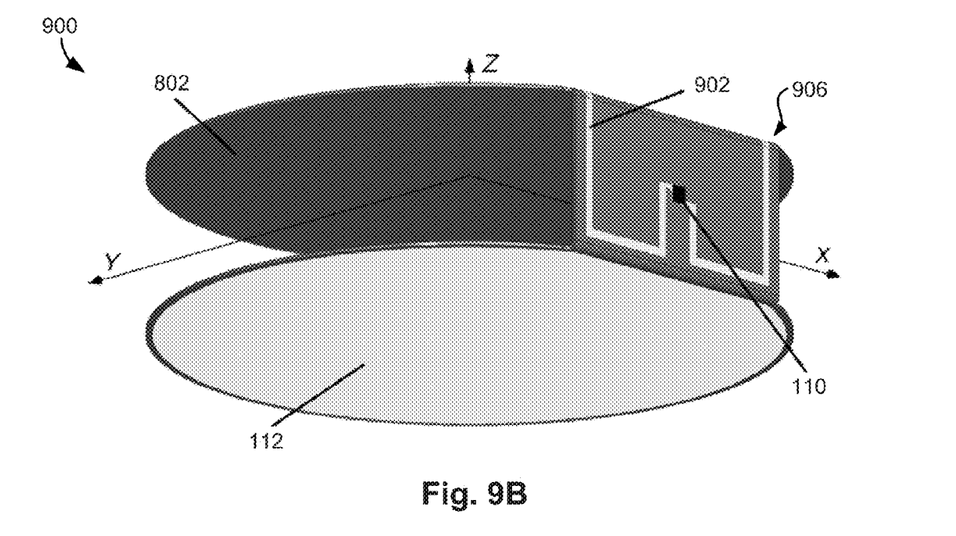
Figure 9C:
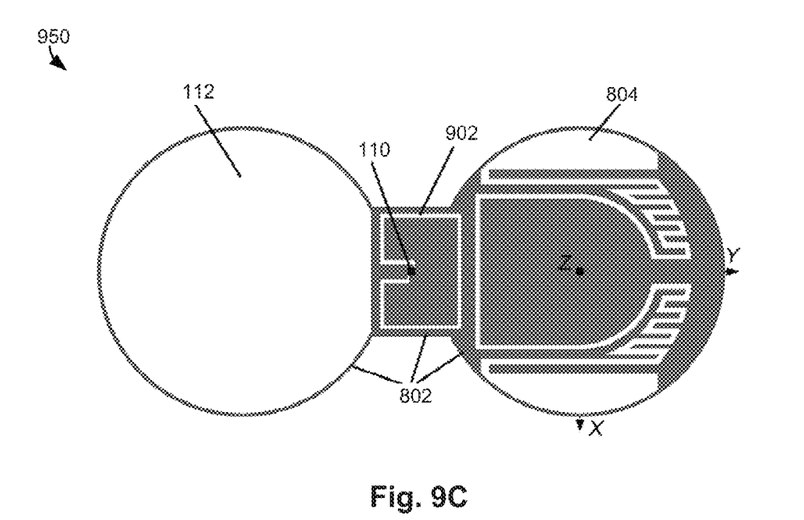
FIG. 9C is an unfolded view of an RFID tag according to one embodiment.

Furthermore, FIGS. 9A-9C illustrate an RFID tag 900 having a folded structure according to yet another exemplary embodiment. As an option, the present RFID tag 900 may be implemented in conjunction with features from any other embodiment listed herein, such as those described with reference to the other Figs. Of course, however, such RFID tag 900 and others presented herein may be used in various applications and/or in permutations which may or may not be specifically described in the illustrative embodiments listed herein. Further, the RFID tag 900 presented herein may be used in any desired environment. Thus FIGS. 9A-9C (and the other Figs.) should be deemed to include any and all possible permutations.

Looking to FIGS. 9A-9B, the perspective views of the RFID tag 900 show that the present embodiment is similar to that which is presented in FIGS. 8A-8B. However, the conductive loop 902 of RFID tag 900 does differ in shape from those previously presented herein. As depicted in FIGS. 9A-9B, the conductive loop is wrapped over one of the edges 906 of the RFID tag's folded structure. Thus, the conductive loop is positioned in both the X-Z and X-Y planes. Moreover, a portion of the conductive loop is positioned in the same plane as the radiating element itself. Such a relationship desirably provides more stable magnetic coupling and impedance matching between the conductive loop and the RFID IC. Moreover, these desirable increases to magnetic coupling stability and impedance matching are achievable generally independent of the angle at which the substrate is folded at the edge 906.

Looking momentarily to FIG. 9B, a bottom portion of the RFID tag 900 is shown, thereby illustrating an exemplary shape of the conductive layer 112 according to the present embodiment.

Further still, FIG. 9C illustrates the unfolded structure of an RFID tag 950 according to an exemplary embodiment, which is in no way intended to limit the invention. As mentioned above, the substrate according to any of the approaches described herein may include a flexible material. Therefore, the substrate may be folded, e.g., during production, to form the general three dimensional RFID tag shape as seen in FIGS. 8A-8B. Thus, it follows that the substrate and/or RFID tag as a whole may be formed on an unfolded structure as seen in the present embodiment of FIG. 9C.

The radiating element 804, conductive loop 902, RFID IC 110 and conductive layer 112 are positioned on a same side of the unfolded flexible dielectric substrate 802. Having the components formed on the same side of the unfolded substrate structure allows for the substrate to later be folded, thereby forming a general three dimensional RFID tag shape as seen herein.

Such folded RFID tag structures and the corresponding relationship between components thereof desirably reduces production cost as the RFID tag structures may be produced by standard single layer printed circuit board processes, e.g., such as inlay with flip-chip bonding, or any other process which would be apparent to one skilled in the art upon reading the present description.

According to an exemplary embodiment, a housing of any suitable material (e.g., plastic, etc.) may be used in combination with any of the approaches described and/or suggested herein. According to one approach, the housing may enclose, abut, be coupled to, etc. at least one side of an RFID tag, depending on the desired embodiment. Preferably, the housing completely encapsulates the RFID tag. The housing may protect the RFID tag from the elements, e.g., moisture, contaminants, impact, etc.; assist in mounting the RFID tag; etc. The housing is preferably substantially RF transparent.

Many types of devices can take advantage of the embodiments disclosed herein, including but not limited to Radio Frequency Identification (RFID) systems (all Classes) and other wireless devices/systems; portable electronic devices such as portable telephones and other audio/video communications devices; and virtually any type of electronic device where an antenna is utilized. To provide a context, and to aid in understanding the embodiments of the invention, much of the present description shall be presented in terms of an RFID system such as that shown in FIG. 10. It should be kept in mind that this is done by way of example only, and the invention is not to be limited to RFID systems, as one skilled in the art will appreciate how to implement the teachings herein into electronics devices in hardware and, where appropriate, software. Examples of hardware include Application Specific Integrated Circuits (ASICs), printed circuits, monolithic circuits, reconfigurable hardware such as Field Programmable Gate Arrays (FPGAs), etc.

Figure 10:
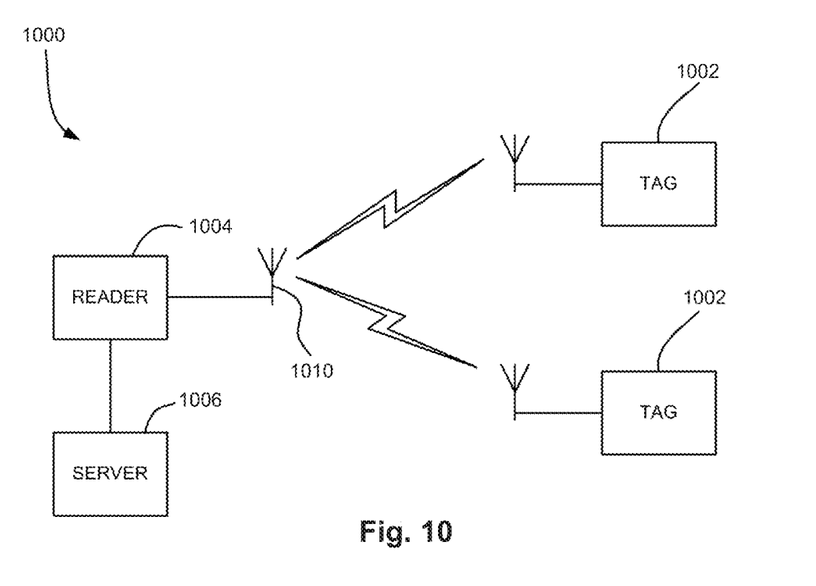
FIG. 10 is an RFID system according to one embodiment.

FIG. 10 depicts an RFID system 1000, in accordance with one embodiment. As an option, the present RFID system 1000 may be implemented in conjunction with features from any other embodiment listed herein, such as those described with reference to the other Figs. Of course, however, such RFID system 1000 and others presented herein may be used in various applications and/or in permutations which may or may not be specifically described in the illustrative embodiments listed herein. Further, the RFID system 1000 presented herein may be used in any desired environment. Thus FIG. 10 (and the other Figs.) should be deemed to include any and all possible permutations.

As shown in FIG. 10, an RFID system 1000 includes RFID tags 1002, a reader 1004, and an optional backend system, e.g., server 1006. Each tag 1002 includes an IC chip and an antenna. The IC chip includes a digital decoder needed to execute the computer commands that the tag 1002 receives from the tag reader 1004. In some tags 1002, the IC chip also includes a power supply circuit to extract and regulate power from the RF reader; a detector to decode signals from the reader; a backscatter modulator, a transmitter to send data back to the reader; anti-collision protocol circuits; and at least enough memory to store its EPC code.

Communication begins with a reader 1004 sending out signals via an antenna 1010 to find the tag 1002. When the radio wave hits the tag 1002 and the tag 1002 recognizes and responds to the reader's signal, the reader 1004 decodes the data programmed into the tag 1002 and sent back in the tag' reply. The information can then be passed to the optional server 1006 for processing, storage, and/or propagation to another computing device. By tagging a variety of items, information about the nature and location of goods can be known instantly and automatically.

RFID systems may use reflected or "backscattered" radio frequency (RF) waves to transmit information from the tag 1002 to the reader 1004. Since passive (Class-1 and Class-2) tags get all of their power from the reader signal, the tags are only powered when in the beam of the reader 1004. Class-3 and higher tags may include an on-board power source, e.g., a battery.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A Radio Frequency Identification (RFID) tag, comprising:
    a radiating element lying primarily along a plane;
    a conductive loop lying along a plane oriented about perpendicular to the plane of the radiating element;
    an integrated circuit coupled to the conductive loop; and
    a conductive layer, the conductive loop being positioned between the radiating element and the conductive layer, wherein the conductive layer has sides that extend upwardly from a bottom plane thereof, wherein the conductive layer lies primarily along a plane oriented parallel to the plane of the radiating element and perpendicular to the plane of the conductive loop.

2. The RFID tag of claim 1, wherein the radiating element is rectangular.

3. The RFID tag of claim 1, wherein the radiating element and conductive layer are configured as a patch antenna.

4. The RFID tag of claim 1, wherein the conductive loop is offset from a center of the radiating element.

5. The RFID tag of claim 1, wherein the conductive loop is positioned at about a center of the radiating element.

6. The RFID tag of claim 1, wherein an impedance of the conductive loop about matches an impedance of the integrated circuit.

7. The RFID tag of claim 1, wherein a length of the conductive loop is from about $1/1000$ of an operational wavelength to about $1/5$ of the operational wavelength of the RFID tag.

8. The RFID tag of claim 1, wherein there is no path of conductive material extending between the conductive loop and radiating element that directly electrically couples the conductive loop to the radiating element.

9. The RFID tag of claim 1, wherein the radiating element is configured in an H configuration having two portions connected by a narrower conductive path therebetween.

10. The RFID tag of claim 9, wherein the conductive loop extends along the conductive path.

11. The RFID tag of claim 1, wherein the radiating element has cutouts defining conductive orthogonal paths.

12. The RFID tag of claim 11, wherein the conductive loop extends along one of the conductive orthogonal paths.

13. The RFID tag of claim 1 wherein the conductive loop and the radiating element are positioned on a single, contiguous dielectric substrate.

14. The RFID tag of claim 13, wherein a plane extending along the conductive loop does not intersect the radiating element.

15. The RFID tag of claim 13, wherein a portion of the conductive loop is coplanar with the radiating element.

16. A Radio Frequency Identification (RFID) tag, comprising:
    a radiating element lying primarily along a plane, wherein the radiating element has cutouts defining conductive orthogonal paths;
    a conductive loop lying along a plane oriented about perpendicular to the plane of the radiating element, wherein the conductive loop extends along one of the conductive orthogonal paths;
    an integrated circuit coupled to the conductive loop; and
    a second conductive loop extending along another of the conductive orthogonal paths, the integrated circuit being coupled to both of the conductive loops.

17. The RFID tag of claim 16, wherein the conductive loops lie along orthogonal planes, wherein the orthogonal planes of the conductive loops are each oriented perpendicular to the plane of the radiating element.

* * * * *